(12) United States Patent
Manchester (10) Patent No.: US 6,523,679 B1
(45) Date of Patent: Feb. 25, 2003

(54) CONVEYOR FRAME WITH REMOVABLE WEAR STRIPS

(76) Inventor: Douglas I. Manchester, 1614 Isom, Houston, TX (US) 77039

(*) Notice: Subject to any disclaimer, the term of this patent is extended or adjusted under 35 U.S.C. 154(b) by 0 days.

(21) Appl. No.: 09/761,256

(22) Filed: Jan. 16, 2001

Related U.S. Application Data (60) Provisional application No. 60/176,091, filed on Jan. 14, 2000.

(51) Int. Cl.[7] .............................................. B65G 15/60
(52) U.S. Cl. ...................................... 198/841; 198/842
(58) Field of Search .............................. 198/841, 842, 198/866

(56) References Cited

U.S. PATENT DOCUMENTS

| | | | | |
|---|---|---|---|---|
| 3,779,368 A | * | 12/1973 | Smith | 198/841 |
| 3,964,800 A | * | 6/1976 | Grimes et al. | 198/841 |
| 3,993,185 A | * | 11/1976 | Fleckenstein et al. | 198/841 |
| 4,225,034 A | * | 9/1980 | Sarovich | 198/841 |
| 4,325,480 A | * | 4/1982 | Butt | 198/841 |
| 4,720,008 A | * | 1/1988 | Ufland | 198/841 |
| 4,906,345 A | * | 3/1990 | Gramarossa et al. | 204/202 |
| 4,951,809 A | * | 8/1990 | Boothe et al. | 198/841 |
| 4,989,723 A | * | 2/1991 | Bode et al. | 198/635 |
| 5,082,108 A | * | 1/1992 | Douglas | 198/836.4 |
| 5,186,314 A | * | 2/1993 | Clopton | 198/860.2 |
| 5,190,145 A | * | 3/1993 | Ledginham et al. | 198/841 |
| 5,310,047 A | * | 5/1994 | Ledginham et al. | 198/841 |
| 6,170,649 B1 | * | 1/2001 | Radandt et al. | 198/860.1 |
| 6,371,283 B1 | * | 4/2002 | Manchester | 198/816 |

* cited by examiner

*Primary Examiner*—Douglas Hess
(74) *Attorney, Agent, or Firm*—Kenneth A. Roddy (57) ABSTRACT

A modular sanitary conveyor includes a longitudinal conveyor bed frame that is slidably received and supported on a support stand and a motor and clutch assembly that is slidably received and supported on the side of the frame. The frame has lateral side walls secured together by a series of cross members and has a serpentine support way for supporting belts and table top chains that is formed of individual wear strips that are installed, retained in place, and removed without the use of tools. Unitary bearings are slidably received in slots at each end of the side walls and rotatably support a drive sprocket shaft and an idler sprocket shaft having respective drive sprockets and idler sprockets slidably received thereon. All components can be easily and quickly disassembled for cleaning and reassembled without the use of special tools.

18 Claims, 4 Drawing Sheets

CONVEYOR FRAME WITH REMOVABLE WEAR STRIPS

CROSS REFERENCE TO RELATED APPLICATION

This application claims priority of U.S. Provisional Patent Application Ser. No. 60/176,091 filed Jan. 14, 2000, the pendency of which is extended until Jan. 16, 2001 under 35 U.S.C. 119(e)(3). This application is closely related to U.S. patent application Ser. No. 09/494,254, now pending, which is hereby incorporated by reference to the same extent as if fully set forth herein.

BACKGROUND OF THE INVENTION

1. Field of the Invention

This invention relates generally to belt-type conveyors, and more particularly to a modular sanitary conveyor having removable wear strips that is suitable for use in applications in which strict sanitary standards must be met, such as the food industry.

2. Brief Description of the Prior Art

Conveyors are typically used for the transport of many articles including produce and food products. Sanitation is a primary consideration in the food processing industry, and the conveyors must be maintained in a clean and hygienic condition to meet basic sanitary standards. Some regulations require that the food conveyor be taken apart and completely cleaned every twenty-four hours. Thus, cleaning of the conveyors requires considerable down-time of the equipment.

When conventional conveyors with endless belts are used, it is usually very time-consuming to clean the conveyors because the inside of the bell, the end rollers and all other conveyor parts covered by the belt are very difficult or impossible to clean in an acceptable way. In some instances the conveyors have ledges, pockets, threads, nuts and bolts, and various surfaces which accumulate liquids and/or debris from the food being processed, and some portions of the conveyors may be difficult to access. In other instances the conveyors and belt supporting wear strips have flat surfaces that overlap and form laminations which tend to accumulate liquids and/or debris from the food being processed.

A typical conveyor using modular or "table top" type chain typically includes a conveyor support to support the chain. In some prior art conveyors the support way is provided with replaceable wear strips of low friction material so that, as the wear strips wear out due to the friction involved as the chain passes over the strips, the strips are easily replaced. Some prior art conveyors employ a pair of round or rectangular wear strips which wind from one end of the conveyor support way to the other in a "serpentine" configuration. In order to maintain the wear strips in the desired serpentine configuration, the wear strips have typically been bolted or otherwise fastened to cross members disposed in spaced relationship along the length of the return way.

Although bolting serpentine wear strips to cross members has proven to be useful where the wear strips are formed of material having a low thermal coefficient expansion, the bolting technique is not particularly useful where the wear strip is composed of a material having a high thermal coefficient of expansion, such as ultra-high molecular weight or "UHMW" polyethylene. This is because when a strip of material fixedly secured between two stationary members becomes heated, the resultant expansion of material will cause an increased lateral curvature of the serpentine wear strip or a vertical buckling of the serpentine wear strip thereby reducing desired support of the chain along its full length. Thus, plastic materials with high thermal coefficients of expansion which are highly suitable for use as wear strips, such as UHMW polyethylene, are not commonly used as serpentine wear strips.

The bolting technique of installing wear strips require strips with bolt holes at precise locations along their length, and each wear strip must be individually bolted to each cross member, and unbolted to replace and/or clean. Thus, the bolted wear strips require a threaded bore in the surface that supports them, and they have holes and flat surfaces that overlap the support surface and form laminations which tend to accumulate liquids and/or debris from the food being processed.

There are several patents that disclose various sanitary conveyors and conveyor belt wear strip apparatus.

Fleckenstein et al, U.S. Pat. No. 3,993,185 discloses a sanitary conveyor for use in strict sanitary environments that has a flat or cleated conveyor belt which can be horizontally or angularly positioned as required wherein the belt passes over a smooth, continuous planar bed. The invention further includes a belt tensioning and slack off feature that enables the conveyor, and both sides of the belt to be cleaned without disassembly or removal of the belt from the conveyor.

Grimes et al, U.S. Pat. No. 3,964,800 discloses a wear strip for conveyor chains comprising a flat upper wear member having at least two spaced-apart holes therethrough for the reception of screws or bolts, at least one linear support member joined to the underside of the wear member, and at least two base members joined to the underside of the wear member and having holes therethrough in registry with the holes through the wear member. Each of the holes in the wear member is preferably countersunk on the upper surface.

Bode et al, U.S. Pat. No. 4,989,723 discloses an endless plastic conveyor belt assembled of plastic modules having relatively open pintle slots receiving respective connecting rods. The conveyor frame includes a plurality of straight longitudinally extending, transversally spaced rails having wear surfaces which are plated with wear strips made of a synthetic plastic material and removably mounted in place using button-headed protrusions integrally provided on the undersides of the wear strips near their leading and trailing ends. The button headed protrusions near the leading end snaps into a round hole through the respective rail, and the button headed protrusions near the trailing end snap into a longitudinally elongated slot through the rail.

Butt, U.S. Pat. No. 4,325,480 discloses a conveyor support way for a table top chain comprising a series of alternating first and second transverse cross members. Each of the first cross members contains a first pair of open top spaces and each of said second cross members contains a second pair of open top spaces, the first pair of spaces being disposed laterally inwardly of the second pair of spaces. A pair of serpentine wear strips are provided to support the chain, each extending along the length of the series of cross members, alternately through an associated one of the first cross member spaces and through an associated one of the second cross member spaces. Each wear strip is axially slidably and removably mounted on the series of cross members.

Ledginham et al, U.S. Pat. No. 5,190,145 discloses a conveyor system which utilizes U-shaped mounting clips having U-shaped arm ends which are snapped onto cross members between frame portions of the conveyor system, and are shaped to have snapped therein wear strips that are oriented in serpentine manner as viewed from above. Portions of the wear strips are maintained spaced apart by spacers mounted onto the rods and by spacer pins that are provided on the mounting clips for association with each other or with side frames. Intermediate pinch clips, are provided to hold central regions of the wear strips close to each other, at regions where there are no cross members.

The present invention is distinguished over the prior art in general and these patents in particular by a modular sanitary conveyor which includes a longitudinal conveyor bed frame that is slidably received and supported on a support stand and a motor and clutch assembly that is slidably received and supported on the side of the frame. The frame has lateral side walls secured together by a series of cross members and has a serpentine support way for supporting belts and table top chains that is formed of individual wear strips that are installed, retained in place, and removed without the use of tools. Unitary bearings are slidably received in slots at each end of the side walls and rotatably support a drive sprocket shaft and an idler sprocket shaft having respective drive sprockets and idler sprockets slidably received thereon. All components can be easily and quickly disassembled for cleaning and reassembled without the use of special tools.

SUMMARY OF THE INVENTION

It is therefore an object of the present invention to provide a modular sanitary conveyor that is particularly useful in applications in which strict sanitary standards must be met, such as the food industry, and all of the components can be steam cleaned.

It is another object of this invention to provide a modular sanitary conveyor having a unitized conveyor bed unit that easily and quickly slides laterally onto and off of, and is supported on a mobile support stand in horizontal or inclined disposition.

Another object of this invention is to provide a modular sanitary conveyor having a drive motor unit that easily and quickly slides laterally onto and off of, and is securely supported on either side of a unitized conveyor bed unit.

Another object of this invention is to provide a modular sanitary conveyor having a removable sprocket shaft and bearing assembly rotatably supported in unitary bearing members which are formed of low friction self-lubricating material that is approved by the USDA and FDA for food grade service, and which are easily and quickly installed and removed from the conveyor bed.

Another object of this invention is to provide a modular sanitary conveyor having a serpentine belt or table top chain support way formed of individual replaceable wear strips that are easily and quickly installed and removed without the use of tools and do not require the bolting of the wear strips to the cross members.

Another object of this invention is to provide such a support way which utilizes wear strips formed of a material having a high thermal coefficient of expansion and yet avoids the problems encountered through vertical buckling of the wear strips.

Another object of this invention is to provide such a support way which utilizes plastic wear strips and accommodates the thermal expansion and contraction of the plastic wear strips without negative effects.

A further object of this invention is to provide a modular sanitary conveyor that requires no screws, bolts, nuts, or washers and wherein all of the components may be easily and quickly manually disconnected and dismantled for cleaning, in a matter of minutes, without requiring special tools.

A still further object of this invention is to provide a modular sanitary conveyor that is simple in construction, inexpensive to manufacture, and is rugged and reliable in operation.

Other objects of the invention will become apparent from time to time throughout the specification and claims as hereinafter related.

The above noted objects and other objects of the invention are accomplished by a modular sanitary conveyor which includes a longitudinal conveyor bed frame that is slidably received and supported on a support stand and a motor and clutch assembly that is slidably received and supported on the side of the frame. The frame has lateral side walls secured together by a series of cross members and has a serpentine support way for supporting belts and table top chains that is formed of individual wear strips that are installed, retained in place, and removed without the use of tools. Unitary bearings are slidably received in slots at each end of the side walls and rotatably support a drive sprocket shaft and an idler sprocket shaft having respective drive sprockets and idler sprockets slidably received thereon. All components can be easily and quickly disassembled for cleaning and reassembled without the use of special tools.

DESCRIPTION OF THE PREFERRED EMBODIMENT

The present invention has some features that are described in my previous patent application Ser. No. 09/494,254, now pending, which is hereby incorporated by reference to the same extent as if fully set forth herein. The present invention also contains significant improvements and features not disclosed in the previous patent application.

Figure 1:
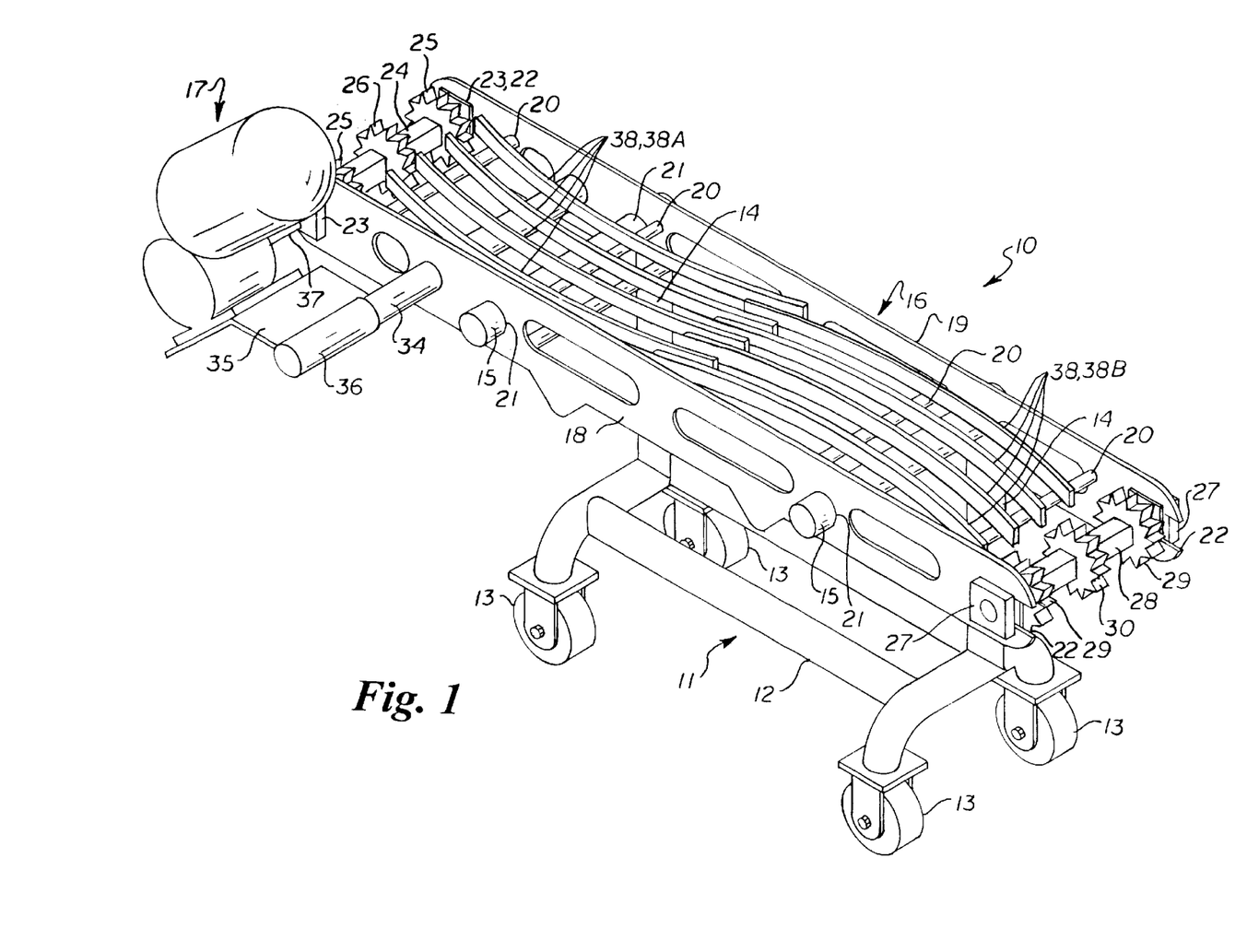
FIG. 1 is an isometric view of a modular sanitary conveyor having a frame with removable wear strips in accordance with the present invention, shown without the belt or chain to more clearly show the wear strips.

Referring to the drawings by numerals of reference there is shown in FIG. 1, a preferred modular sanitary conveyor assembly 10 in accordance with the present invention supported on a support stand 11. The support stand 11 is of tubular construction. The stand 11 has a rectilinear base 12 formed of tubular members supported on wheels 13 attached near the four corners thereof. A pair of tubular vertical support arms 14 are secured at their bottom ends to one side of the base 12 and each has a tubular horizontal arm 15 secured near their top end that extend a distance over the base 12. The vertical support arms 14 may be of equal height to place the bed of the conveyor assembly 10 horizontally, as shown, or may be of unequal height to place it at an angle relative to horizontal, depending upon the particular installation requirements. It should be understood that the vertical legs 14 may also be of telescopically adjustable construction, and that the wheels my be replaced with a fixed base.

The conveyor assembly 10 includes a longitudinal conveyor bed frame 16 that slides laterally on and off of, and is supported on the horizontal arms 15 of the support stand 11. A motor and clutch assembly 17 slides laterally onto, and is secured to the conveyor bed frame 16.

The conveyor bed frame 16 is of generally open construction having left and right side panels or side walls 18 and 19, respectively, secured in laterally spaced relation by a series of transverse tubular cross members 20. In a preferred embodiment, the cross members 20 are welded between the left and right side walls 18 and 19. A pair of longitudinally spaced apart holes 21 are formed in each side wall 18 and 19 in laterally opposed axially aligned relation to slidably receive the horizontal arms 15 of the support stand 11. Each of the side walls 18,19 is provided with an inwardly extending longitudinal slot 22 at their opposed ends.

The a preferred embodiment, the components of the welded frame 16 and stand 11 are formed of stainless steel or other suitable metal and in some applications may be surface finished by electropolishing. Electropolishing is an electrochemical process that provides metal surfaces with a microscopic featureless surface which provides ultra-clean, ultra-smooth surfaces. This process is typically performed by submerging the part in an acid bath ant providing a means of contact to a direct electrical current. Electropolishing is similar to plating except, in plating, the part is cathodic and attracts the metal being plated onto the part, while in electropolishing the part is anodic which allows the surface to give up material (metal) ion by ion. Simply stated the microscopic peaks or high spots on the metals have a greater electrical potential while electropolishing is taking place effectively dissolving these peaks at a faster rate than the areas around the feature. The end result is a surface where all burrs, tears, grain boundaries, and irregularities have been reduced to a uniform smooth microscopic featureless surface. Thus, the finish of the frame 16 has a surface finish that significantly reduces particle retention, product adhesion, bacterial entrapment, corrosion sites, and radioactive contamination retention.

Figure 2:
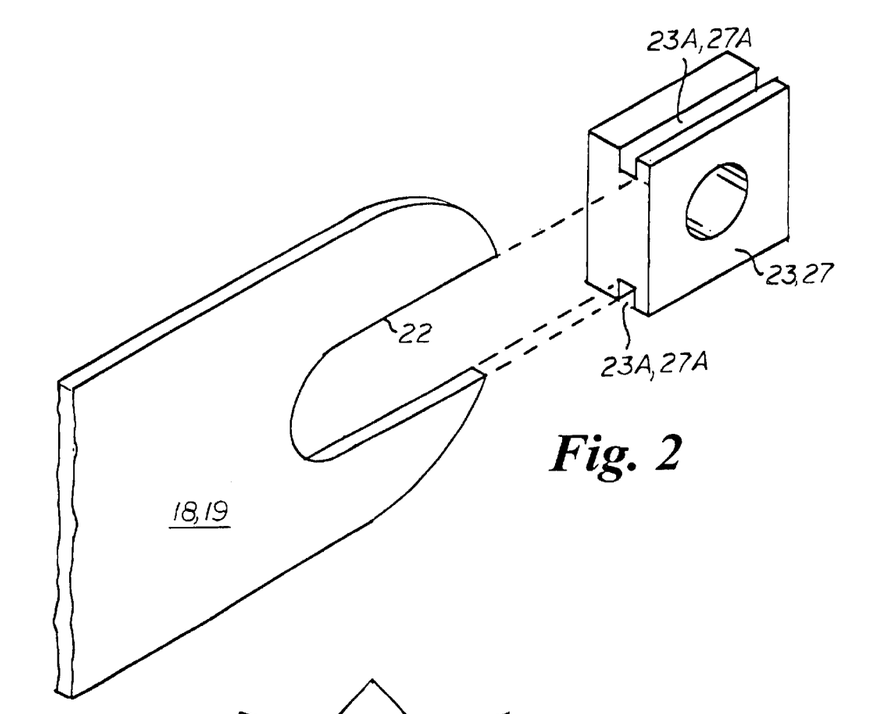
FIG. 2 is an exploded isometric view showing a portion of the slotted side wall and unitary bearing member.

Referring additionally to FIG. 2, a pair of generally rectangular drive shaft bearing members 23 having slots 23A along their top and bottom ends are removably mounted in the inwardly extending slots 22 on laterally opposed sides of the side panels 18,19 at the forward end or discharge end of the conveyor bed frame 16. The slots 23A are received on the vertically opposed surfaces of the slots 22. A drive sprocket shaft 24 having a midsection of square cross section and opposed cylindrical ends is rotatably supported at each end in the bearing members 23. A pair of lateral drive sprockets 25 and a center drive sprocket 26 are removably mounted on the drive sprocket shaft 24 to rotate therewith. In FIG. 1, the sprockets are shown somewhat schematically, but it should be understood that their outer periphery would be toothed or otherwise configured to engage a conventional conveyor belt or table top chain type belt.

A pair of generally rectangular idler sprocket shaft bearing members 27 having slots 27A along their top and bottom ends are removably mounted in the inwardly extending slots 22 on the laterally opposed sides of the side panels 18,19 at the tail end or receiving end of the conveyor bed frame 16.

Figure 3:
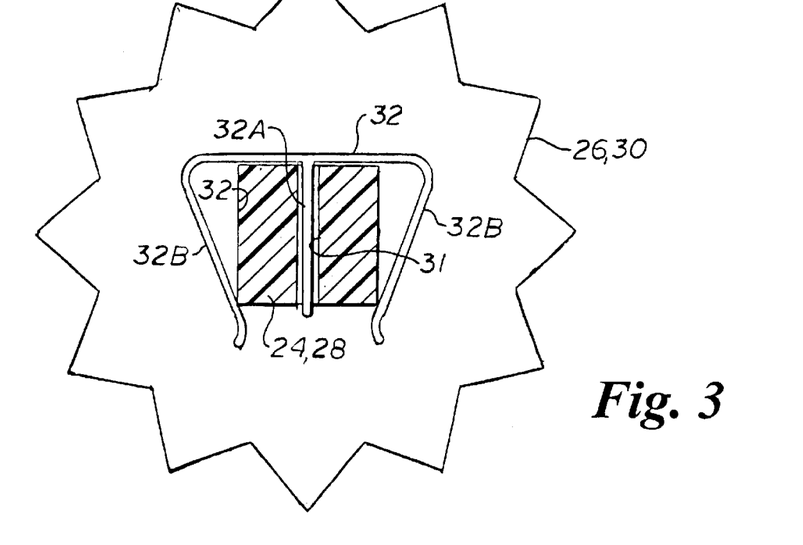
FIG. 3 is a transverse cross section of shaft midsection with a center sprocket and retainer clip installed thereon.

An idler sprocket shaft 28 having a midsection of square cross section and opposed cylindrical ends is rotatably supported at each end in the bearing members 27. A pair of lateral idler sprockets 29 and a center idler sprocket 30 are removably mounted on the idler sprocket shaft 28 to rotate therewith Referring now to FIG. 3, the rectangular midsection of the drive sprocket shaft 24 and idler sprocket shaft 28 are provided with a pair of laterally spaced holes 3 extending transversely therethrough. Each of the sprockets has a central rectangular bore 32 slidably received on the respective shaft midsection and the center sprockets are disposed between the holes 31, and their lateral movement is controlled by spring retainer clips 32. Each spring retainer clip 32 has a central straight pin 32A and a pair of resilient arm portions 32B extending outwardly and downwardly from one end of the pin in laterally opposed relation. The spring retainer clips 32 are removably installed on the respective shaft, one at each side of the center sprocket, by inserting its pin 32A into a respective one of the holes 31 such that its arm portions 32B encompass opposed sides of the shaft in laterally inward spring biased relation. It should be understood that, depending upon the width of the conveyor, there may be a few as one drive sprocket and idler sprocket on a respective shaft, or there may be a plurality of sprockets.

Figure 4:
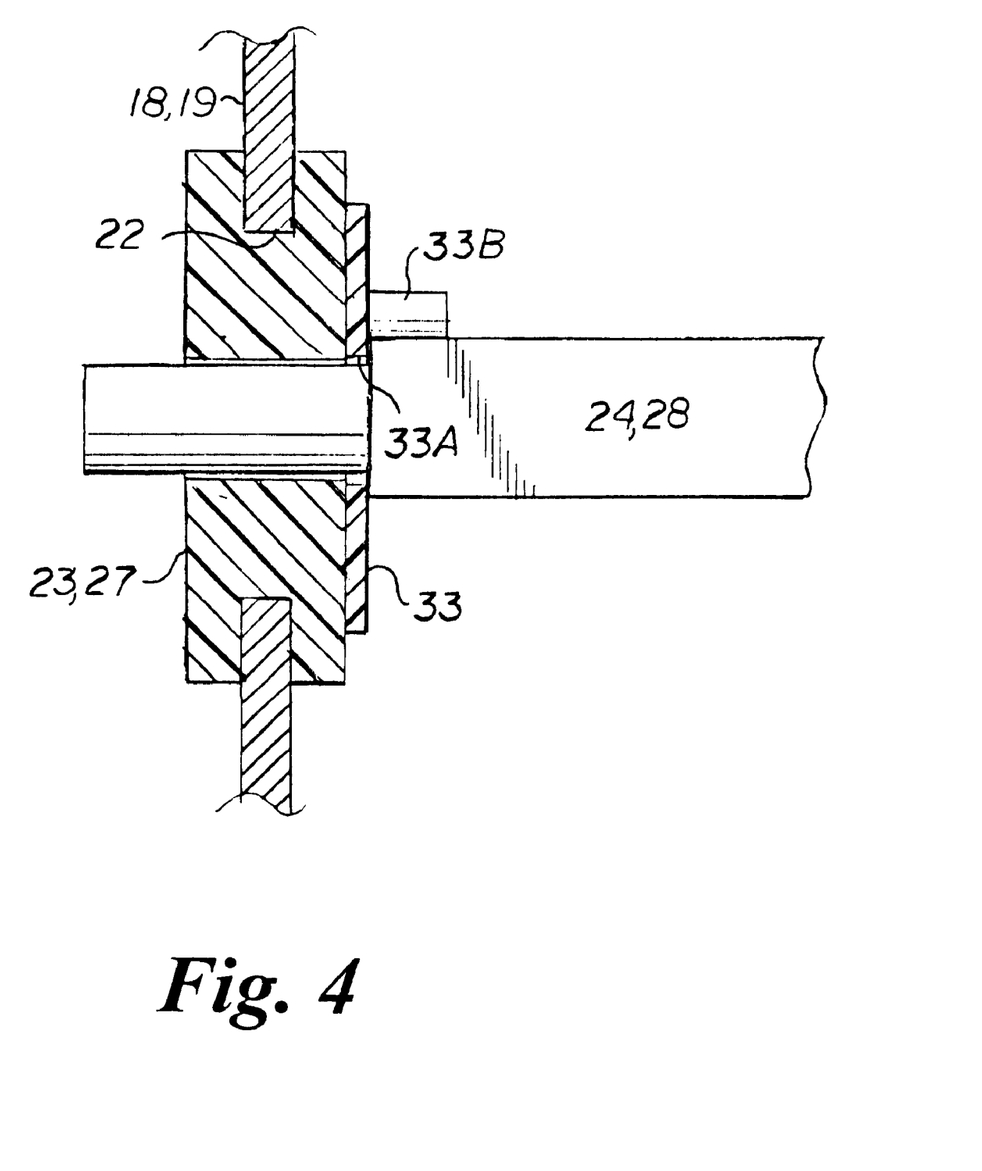
FIG. 4 is a longitudinal cross section of one end of a shaft installed in the bearing with a thrust washer disposed therebetween.

As seen in FIG. 4, a disk-shaped thrust washer 33 formed of low-friction material is slidably received on the cylindrical ends of the shafts 24 and 28. Each thrust washer 33 has a flat front side and back side, a central circular bore 33A, and a short pin 33B radially spaced from the central bore extending outward from the front side. Each thrust washer 33 has its front side in contact with one end of the rectangular midsection of the respective shaft and its pin 33B received on a flat side of the rectangular midsection and its back side is in contact with an outer surface of a respective one of the bearing members. Thus, the thrust washer 33 rotates with the shaft relative to the bearing members to reduce friction and prevent wear between the rectangular portion and bearing.

All of the bearing members and thrust washers are non-lubricated and, preferably, are made of plastic that is approved by the USDA and FDA for food grade service. The sprocket members are also preferably made of plastic that is approved by the USDA and FDA for food grade service. All of the components of the present invention can be steam cleaned or chemically cleaned.

Referring again to FIG. 1, one cylindrical end of the drive sprocket shaft 24 extends through the one of the rectangular bearing members 23 and is provided with flats at its outer end. A mounting rod 34 is secured transversely between the side panels 18,19 and extends outwardly a distance from one side panel with its axis parallel to the axis of the drive sprocket shaft 24. The motor and clutch assembly 17 is mounted on a motor mount plate 35. The motor mount plate 35 has a hollow tube 36 secured across one end. The clutch connected with the motor has a tubular collar or arbor 37 extending outwardly therefrom with internal flats that receive the flats on the outer end of the drive sprocket shaft 24.

The motor mount plate 35 with the motor and clutch assembly 17 mounted thereon is assembled onto the conveyor bed frame 16 by sliding the tube 36 of the motor mount plate 35 onto the outwardly extending mounting rod 34 and sliding the tubular arbor 37 extending from the clutch onto the outer end of the drive sprocket shaft 24. The motor mount plate 35 is removably secured to the mounting rod 34 by a threaded lock pin (not shown) that extends through the side wall of the tube 36 and engages the mounting rod 34 to secure the motor mount plate on the mounting rod at the correct lateral spacing. A retaining pin (not shown) may also be placed through a transverse hole near the outer end of the mounting rod 34 to prevent the motor assembly from sliding off of the mounting rod in the event that the Lock pin becomes accidentally loosened.

Figure 5:
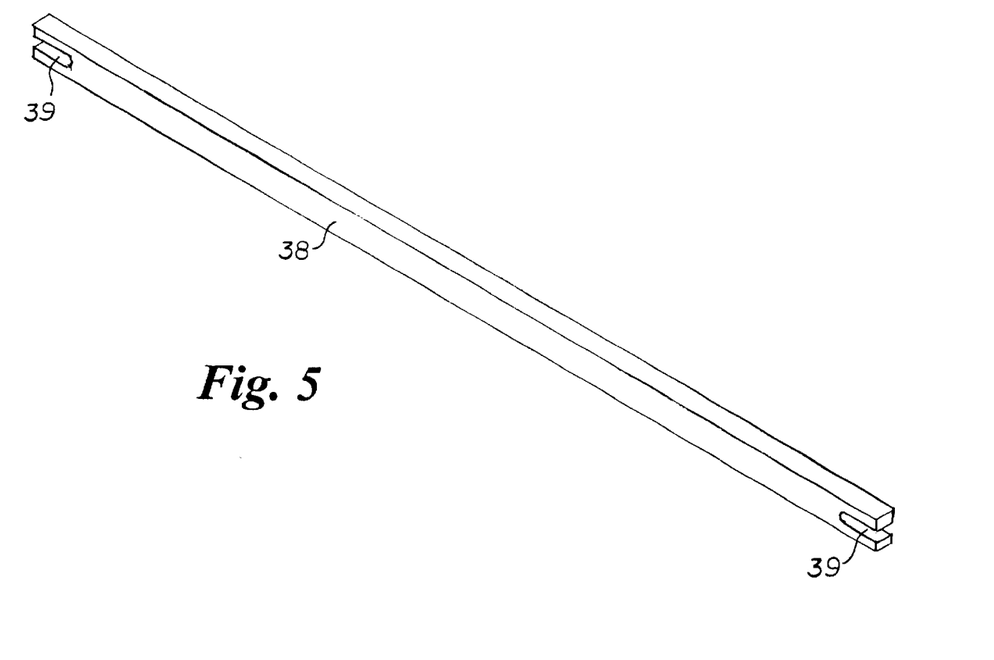
FIG. 5 is an isometric view of a wear strip in an uninstalled condition.
Figure 6:
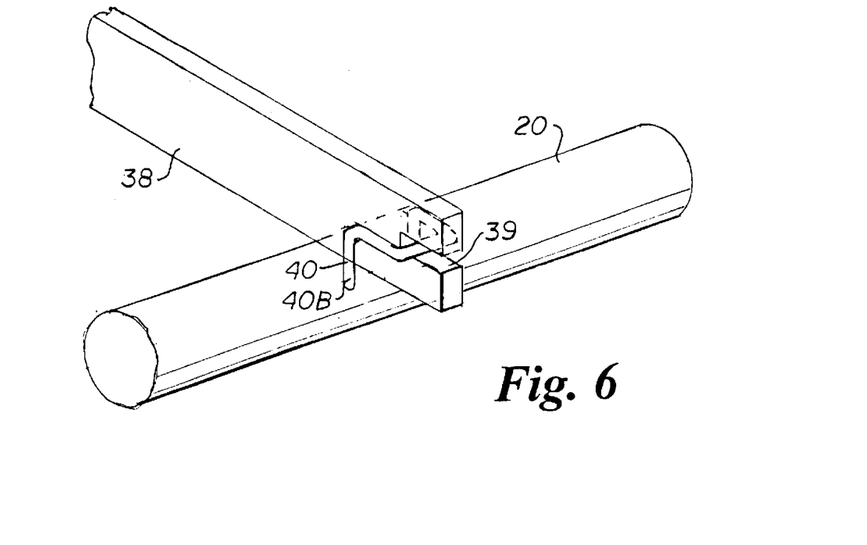
FIG. 6 is an isometric view of one end of the wear strip received in a retaining element in an installed condition.

Referring now to FIGS. 1, 5 and 6, a plurality of elongate wear strips 38 are each removably mounted at their opposed ends on alternate ones of the transverse cross members 20. The wear strips 38 are generally rectangular in cross section and are preferably formed of a suitable stiff or semi-rigid resiliently flexible plastic material that is approved by the USDA and FDA for food grade service. A preferred wear strip material is ultra-high molecular weight (UHMW) polyethylene material. The opposed ends of each wear strip 38 has an inwardly extending longitudinal slot 39.

As shown in FIG. 6, a plurality of retainer elements 40 are secured to alternating ones of the cross members 20 in laterally spaced relation. Each retainer element 40 has a generally horizontal U-shaped portion 40A with depending vertical legs 40B at each end thereof that are secured to the cross member, preferably by welding.

Each wear strip 38 has a generally straight configuration in an uninstalled condition (FIG. 5). The wear strips 38 are installed by placing the slot 39 at one end into the U-shaped portion 40A of one retainer element 10 and manually flexing the wear strip laterally outwardly to resiliently bow be wear strip laterally outward along its length until its free end clears the retainer element on the longitudinally opposed cross member at the free end of the wear strip, and then releasing the wear strip so that the slot at its fret, end becomes engaged on the horizontal U-shaped portion of the opposed retainer element as the wear strip resiliently attempts to resume its original shape. Thus, the wear strips 38 are resiliently urged into spring biased engagement between the opposed retainer elements. The process is reversed to remove the wear strips.

FIG. 1 shows the wear strips 38 in their installed condition. A first set of the wear strips 38A are disposed in generally parallel spaced relation with their laterally curved portions facing the side panel 18 and supported at their midsection on an intermediate cross member 20 disposed between the cross members supporting their opposed ends. A second set of the wear strips 38B are disposed in generally parallel spaced relation with their laterally curved portions facing the side panel 19 and supported at their midsection on an intermediate cross member 20 disposed between the cross members supporting their opposed ends. Each set of wear strips 38A,38B is curved laterally outwardly toward opposite sides, and the facing ends of the sets of wear strips 38 are disposed in laterally spaced alternating relation near the center of the frame 16. Thus, the first and second sets 35A,35B of wear strips 38 collectively form a generally S-shaped or serpentine support way over which the plastic modular endless conveyor belt or table top chain passes.

In a preferred embodiment, the belt or chain that is used in the conveyor assembly is a conventional, commercially available plastic modular endless conveyor belt or table top chain of the type having rectangular plastic modules hinged together by transverse connecting rods received in pintle slots. These types of belts or chains are conventionally used for conveying raw foods and are formed of suitable plastic material that is approved by the USDA and FDA for food grade service.

It should be understood that the belt or table top chain passes around the drive sprockets 25,26, which are driven by the motor, at the forward end of the conveyor bed frame 16 and the idler sprockets 29,30 at its tail or receiving end to form a conveying run that passes over and is supported on the wear strips 35 and a return run disposed beneath the wear strips.

The individual replaceable wear strips 38 are easily and quickly installed and removed without the use of tools and do not require the bolting of the wear strips to the cross members. Because the wear strips are formed of a material having a high thermal coefficient of expansion they accommodate thermal expansion and contraction without negative effects can flex laterally, and substantially reduce or eliminate problems caused by vertical buckling of wear strips.

Because the wear strips of the support way have a generally rectangular cross section with a flat bottom surface and are supported on cross members of circular cross section, the flat bottoms of the wear strips are only supported at a tangent point on the circular periphery of the cross members. Thus, there is a minimum of overlapping surface areas or laminations which can accumulate liquids and/or debris from the food being processed.

All of the components may be easily and quickly disconnected and disassembled for cleaning. The conveyor bed frame slides laterally off of tire support arms of stand. The motor assembly slides off of the conveyor bed frame, and requires no screws, bolts, nuts, or washers. The belt can be removed by removing one or more connecting rods and the plastic belt modules can be removed and replaced individually as needed. The sprocket shafts are easily removed with no special tools required.

Although the support way of the present invention formed of individual wear strips has been described and depicted, by way of example, as being curved, it should be understood that the support way and wear strips may be provided in other shapes and arranged in other patterns.

While this invention has been described fully and completely with special emphasis upon a preferred embodiment, it should be understood that within the scope of the appended claims the invention may be practiced otherwise than as specifically described herein.

What is claimed is:

1. A wear strip for removable installation between a pair of parallel longitudinally spaced apart retaining elements on a conveyor frame without the use of tools or fasteners to support conveyor belts and table top chains, comprising:

a narrow elongate longitudinal wear strip formed of stiff resiliently flexible material having a rectangular transverse cross section with parallel flat top and bottom surfaces, parallel flat lateral side surfaces, and opposed ends; and a longitudinal slot in each of said opposed ends extending transversely between said lateral side surfaces, each said slot extending a distance inwardly from a respective one of said opposed ends and having an open outer end adapted to slidably receive and releasably engage a respective one of the retaining elements;

said wear strip having a generally straight configuration in an uninstalled condition and a length sufficiently greater than the distance between the longitudinally spaced apart retaining elements to become resiliently bowed outwardly along its length with said slots at its said opposed ends urged into resilient spring biased engagement between the longitudinally spaced apart retaining elements in an installed condition.

2. The wear strip according to claim 1, wherein said wear strip is formed of plastic material.

3. The wear strip according to claim 1, wherein said wear strip is formed of ultra-high molecular weight polyethylene material.

4. A conveyor support way for conveyor belts and chains comprising:
a series of first and second cross members disposed in longitudinally spaced alternating relation transverse to the axis of said conveyor support way;
a series of retaining elements disposed in laterally spaced relation on each of said first cross members; and
a series of elongate longitudinal wear strips formed of stiff resiliently flexible material, each having a slot at a first end and a slot at a second end urged into spring biased releasable engagement with a respective one of said retaining elements on longitudinally adjacent ones of said first cross members;
said wear strips resiliently bowed laterally outwardly along their length and supported intermediate their said first and second end on top of said second cross members.

5. The conveyor support way according to claim 4, wherein
each of said wear strips is installed without the use of tools or fasteners by manually flexing it to bow it laterally outward along its length and then releasing it so that said slots at its said first and second ends are urged into resilient spring biased engagement with said respective ones of said retaining elements and is removed by manually flexing it to bow laterally outward along its length so that its said slots at its said first and second ends are disengaged from said respective ones of said retaining elements.

6. The conveyor support way according to claim 4, wherein
each of said first and second cross members is of generally circular cross section; and
each of said wear strips is of generally rectangular transverse cross section with parallel flat lateral side surfaces and a generally flat bottom surface which is supported at a tangent point on top of the circular outer periphery of said first and second cross members to provide minimum overlapping surface areas of contact that may accumulate liquids and debris.

7. The conveyor support way according to claim 4, wherein
each of said retaining elements on said cross members has a generally U-shaped portion; and
each said slot is a longitudinal slot extending a distance inwardly from a respective one of said first and second ends and having an open outer end adapted to receive and engage said U-shaped portion of a respective one of said retaining elements to facilitate installation thereon and removal therefrom without the use of tools or fasteners.

8. A conveyor support way for conveyor belts and chains, comprising:
a pair of end cross members and an intermediate cross member disposed therebetween in longitudinally spaced relation, and a second cross member disposed between said intermediate cross member and said end cross members, said cross members disposed transverse to the axis of said conveyor support way;
each of said end cross members and said intermediate cross member having a series of retaining elements disposed in laterally spaced relation thereon;
a first series and a second series of wear strips formed of stiff resiliently flexible material, each having a first end urged into spring biased releasable engagement with laterally spaced ones of said retaining elements on each of said end cross members, and each having a second end urged into spring biased releasable engagement with laterally spaced ones of said retaining elements on said intermediate cross member in laterally alternating relation;
said first and second series of wear strips resiliently bowed laterally outwardly along their length and supported intermediate their said first and second ends on said second cross members; and
said first series of wear strips disposed in laterally spaced generally parallel relation with their laterally outward bowed portions facing a first direction, and said second series of wear strips disposed in laterally spaced generally parallel relation with their laterally outward bowed portions facing a second direction opposite said first direction to collectively form a generally serpentine support way.

9. A modular sanitary conveyor comprising:
a longitudinal conveyor bed frame having longitudinal lateral side walls disposed in laterally opposed relation by a series of first and second cross members secured therebetween in longitudinally spaced alternating relation transverse to the axis of said conveyor frame;
a series of retaining elements disposed in laterally spaced relation on each of said first cross members; and
a series of elongate longitudinal wear strips formed of stiff resiliently flexible material, each having a slot at a first end and a slot at a second end urged into spring biased releasable engagement with a respective one of said retaining elements on longitudinally adjacent ones of said first cross members;
said wear strips resiliently bowed laterally outwardly along their length and supported intermediate their said first and second end on top of said second cross members in laterally spaced relation between said side walls to form a support way over which a conveyor belt or table top chain slides.

10. The modular sanitary conveyor according to claim 9, wherein
each of said first and second cross members is of generally circular cross section: and
each of said wear strips is of generally rectangular transverse cross section with parallel flat lateral side surfaces and a generally flat bottom surface which is supported at a tangent point on top of the circular outer periphery of said first and second cross members to provide minimum overlapping surface areas of contact that may accumulate liquids and debris.

11. The conveyor support way according to claim 9, wherein
each of said retaining elements of said cross members has a generally U-shaped portion; and
each said slot is a longitudinal slot extending a distance inwardly from a respective one of said first and second ends and having an open outer end adapted to receive and engage said U-shaped portion of a respective one of said retaining elements to facilitate installation thereon and removal therefrom without the use of tools or fasteners.

12. A modular sanitary conveyor, comprising:
a longitudinal conveyor bed frame having longitudinal lateral side walls disposed in laterally opposed relation by a series of cross members secured therebetween in longitudinally spaced alternating relation transverse to the axis of said conveyor frame;

said series of cross members comprising a pair of end cross members and an intermediate cross member disposed therebetween in longitudinally spaced relation, and t said second cross member disposed between said intermediate cross member and said end cross members;

a series of retaining elements disposed in laterally spaced relation on each of said end cross members and said intermediate cross member;

a first series and a second series of elongate longitudinal wear strips each having a first end urged into spring biased releasable engagement with laterally spaced ones of said retaining elements on each of said end cross members, and each having a second end urged into spring biased releasable engagement with laterally spaced ones of said retaining elements on said intermediate cross members in laterally alternating relation;

said first and second series of wear strips resiliently bowed laterally outwardly along their length and supported intermediate their said first and second end on top of said second cross members in laterally spaced relation between said side walls to form a support way over which a conveyor belt or table top chain slides; and said first series of wear strips disposed in laterally spaced generally parallel relation with their laterally outward bowed portions facing a first direction, and said second series of wear strips disposed in laterally spaced generally parallel relation with their laterally outward bowed portions facing a second direction opposite said first direction to collectively form a generally serpentine support way.

13. The modular sanitary conveyor according to claim 12, further comprising:

a longitudinal slot extending inwardly from a forward end and a tail end of each of said side walls, respectively; and a unitary generally rectangular bearing member having a slot extending along upper and lower ends thereof slidably received on vertically opposed surfaces of each of said slots at said forward end and said tail end of said side walls, each said bearing member having a central bore.

14. The modular sanitary conveyor according to claim 13, further comprising:

a longitudinal drive sprocket shaft having a midsection of generally rectangular cross section with opposed first and second cylindrical ends slidably received and rotatably supported in said central bore of said bearing members at said forward end of said side walls, respectively, and one of said drive sprocket shaft cylindrical ends extending laterally outward from one of said side walls; and a longitudinal idler sprocket shaft having a midsection of generally rectangular cross section with opposed first and second cylindrical ends slidably received and rotatably supported in said central bore of said bearing members at said tail end of said side walls, respectively.

15. The modular sanitary conveyor according to claim 14, further comprising:

a pair of lateral drive sprockets and a center drive sprocket removably mounted on said drive sprocket shaft to rotate therewith; and a pair of lateral idler sprockets and a center idler sprocket removably mounted on said idler sprocket shaft to rotate therewith.

16. The modular sanitary conveyor according to claim 15, further comprising:

a motor support bar extending laterally outward a distance from one of said side walls;

a drive motor unit including a drive motor secured to a support plate slidably received and supported on said motor support bar; and shaft connector means connected with a drive shaft of said drive motor and having an outer end received on said laterally extended end of said drive sprocket shaft to impart rotary motion thereto.

17. The modular sanitary conveyor according to claim 12, wherein said frame side walls, said cross members and said retaining elements are formed of metal;

each of said cross members are welded at opposed ends to said frame side walls and said series of retaining elements are welded on each of said first cross members; and said frame welded metal components are surface finished by an electropolishing process to provide a microscopic smooth ultra-clean, ultra-smooth surface devoid of burrs, tears, grain boundaries, and irregularities that significantly reduces particle retention, product adhesion, bacterial entrapment, corrosion sites, and radioactive contamination retention.

18. A method for installing and removing wear strips between a pair of longitudinally spaced apart retaining elements on a conveyor frame without the use of tools or fasteners, comprising the steps of:

providing at least one narrow elongate longitudinal wear strip formed of stiff resiliently flexible material having opposed first and second ends and a slot in each of said first and second ends, said wear strip having a generally straight configuration in an uninstalled condition and a length sufficiently greater than the distance between the longitudinally spaced apart retaining elements;

installing said wear strip by manually flexing it to bow it laterally outward along its length and then releasing it so that said slots in its said first and second ends are urged into resilient spring biased engagement with respective ones of the longitudinally spaced apart retaining elements; and removing said wear strip by manually flexing it to bow laterally outward along its length so that said slots in its said first and second ends are disengaged from said respective ones of said retaining elements.

* * * * *